S. J. LESSING.
AUTOMOBILE NUMBER LIGHT.
APPLICATION FILED FEB. 10, 1912.
1,145,692.
Patented July 6, 1915.
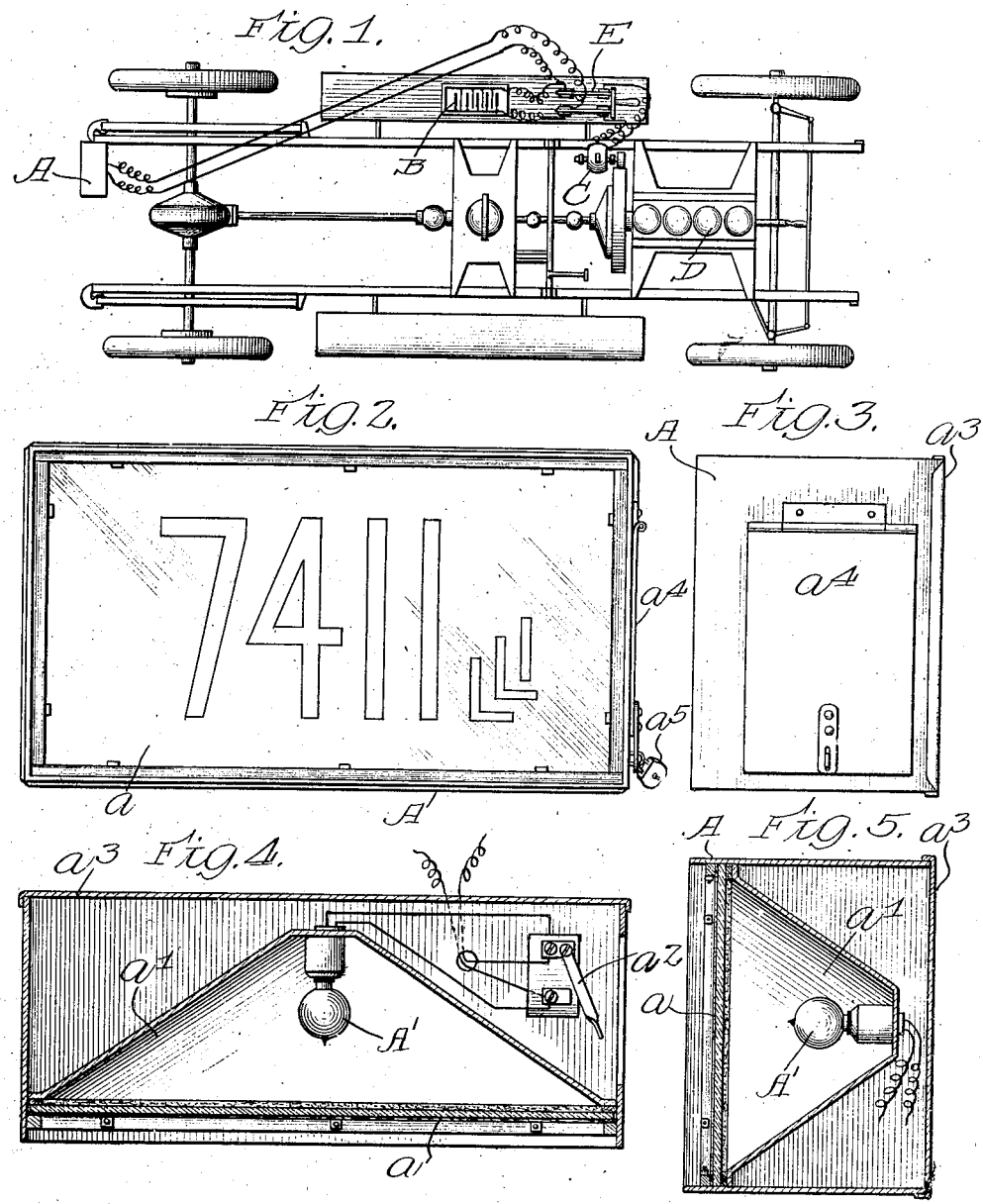

UNITED STATES PATENT OFFICE.

SAMUEL J. LESSING, OF CHICAGO, ILLINOIS.

AUTOMOBILE NUMBER-LIGHT.

1,145,692.  Specification of Letters Patent.  Patented July 6, 1915.

Application filed February 10, 1912. Serial No. 676,906.

*To all whom it may concern:*

Be it known that I, SAMUEL J. LESSING, a citizen of the United States of America, and resident of Chicago, Cook county, Illinois, have invented a certain new and useful Improvement in Automobile Number-Lights, of which the following is a specification.

My invention contemplates an automobile number, and means for illuminating it, whereby the number is visible in the dark.

My invention further contemplates a number of this kind which is lighted by electricity.

My invention further contemplates an automobile number light that is inclosed within a chamber which also contains the switch or other means for turning it on and off, and which has a lock, whereby the light cannot be turned on and off at will from the seat of the automobile, the turning out of the light being possible only by stopping the automobile and going around to the rear end thereof.

In the accompanying drawings—Figure 1 is a plan, more or less diagrammatic in character, of an automobile equipped with a number light embodying the principles of my invention. Fig. 2 is an enlarged front elevation of the box containing said number and light. Fig. 3 is an end elevation of said box. Fig. 4 is a horizontal section of said box. Fig. 5 is a transverse central section of said box.

As thus illustrated, my invention comprises a metal or other substantial box A mounted in any suitable manner on the rear end of the automobile. This box has a rearwardly facing plate or wall $a$ of glass or other transparent material which has the number of the automobile displayed thereon in any suitable manner, as shown in Fig. 2. Back of this glass is a funnel-shaped wall $a'$ which has the electric lamp A' at the center thereof, and which has a surface serving as a reflector for the light. A switch $a^2$, of any suitable character, is disposed within the box at one end thereof, between the wall $a'$ and the back wall $a^3$, for controlling the circuit of said lamp. The end of the box at which the said switch is located is provided with an opening having a door $a^4$. Any suitable form of lock may be provided for said door, as, for example, the padlock $a^5$, whereby the only means for controlling the said lamp is inaccessible when the said door is locked.

The driver cannot turn out the light except by stopping the automobile and going around to the rear end thereof. Furthermore, and if the circumstances warrant, the driver or chauffeur may not have the key. In such case the owner of the car is practically certain that the number light will not be turned off until the proper time. In other words, there is no provision whereby the light can be flashed on and off while the car is running along the street.

Any suitable means of supply can be employed for furnishing the current for said lamp. As a matter of further and special improvement, however, the storage battery B, by which the current is supplied for the engine ignition, is connected with the circuit of said lamp. This battery is charged by current from the generator C operated in any suitable manner by the engine D of the automobile. A switch E is provided for cutting in and out the said generator. Thus the number light is supplied with current from the source already found on the car for other purposes.

Thus I provide a number light which causes the number of the automobile to be brilliantly and effectively illuminated and thereby made visible at night. The lamp and number and controlling switch are, as explained, all inclosed and locked up in a box which is unitary and substantial in character. Moreover, the location of the switch at the lamp insures lighting of the same, and instant detection of any trouble in the circuit, or at the source of current. To the contrary, the driver might many times turn a switch at the dash without knowing that the lamp was not lighted by so doing.

It will be seen that the deflector $a'$ segregates the lamp A' from the switch $a^2$, and thereby renders the said lamp inaccessible at all times. This prevents improper removal of said lamp, and thereby precludes the loss or theft thereof. To remove the said lamp, in order to renew the same when burned out, the structure of the box must be taken apart. Thus it is not only possible to lock up and prevent access to the switch, but with the construction shown, access to the switch does not necessarily or incidentally afford access to the lamp, and hence loss or theft of the incandescent lamp bulb is precluded as well.

The strips C are interposed between the plate $a$ and the rim of the reflector $a'$, to form a dust tight chamber for the light. These strips may be of any suitable material. The strips D are secured to the box in any suitable manner, by fastening devices of any suitable character, as indicated, and bear against the plate $a$, along the edges thereof, to hold the same in place. Thus the reflector $a'$ and the plate $a$ coöperate to form a dust tight and inaccessible chamber for the lamp A', which latter can only be removed by taking out the front of the box, after detaching the strips D in any suitable manner; and as tools are required for the removal of the strips D, it follows that the lamp is practically safe and inaccessible. Also it will be seen that the plate $a$ and strips D are set inward a distance from the front of the box, thus providing in effect an overhang which tends to make the front of the box water tight or weather proof.

I do not limit myself to the exact construction shown and described.

What I claim as my invention is:

1. An automobile number box provided with front and rear walls, said front wall being non-removable except by the use of tools, a reflector fixed in said box, dividing the interior thereof into separate front and rear chambers mutually closed to each other, an electric lamp in said front chamber, said front wall being adapted to transmit light, said reflector and front wall coöperating to prevent improper removal of said lamp, a manual switch for said light in said rear chamber, a door for said rear chamber located adjacent said switch, and a lock for said door, said box having top and bottom and end walls which extend beyond said front wall.

2. An automobile number box comprising fixed top and bottom and end walls, a fixed back wall, a door for one end wall, a switch immediately inside said door, a number plate forming the front wall of the box, means for holding said plate in position, a concave reflector back of said plate, forming therewith a closed chamber, a filler interposed between the rim of the reflector and the marginal surface of said plate, to seal said chamber, and an electric light in said chamber, controlled by said switch.

3. An automobile number box comprising fixed top and bottom and end walls, a fixed back wall, a number plate forming the front wall of the box, a reflector back of said plate, forming therewith a closed chamber, a filler interposed between the rim of the reflector and the marginal surface of said plate, to seal said chamber, an electric light in said chamber, and strips bearing against the outer surface of the said plate, along the edges thereof, disposed a distance within the box, and bolts for securing said strips in position, whereby the plate and filler are clamped tightly against the reflector.

Signed by me at Chicago, Illinois, this 7th day of February, 1912.

SAMUEL J. LESSING.

Witnesses:
S. L. GLOVER,
S. LEWIS.